Patented May 5, 1953

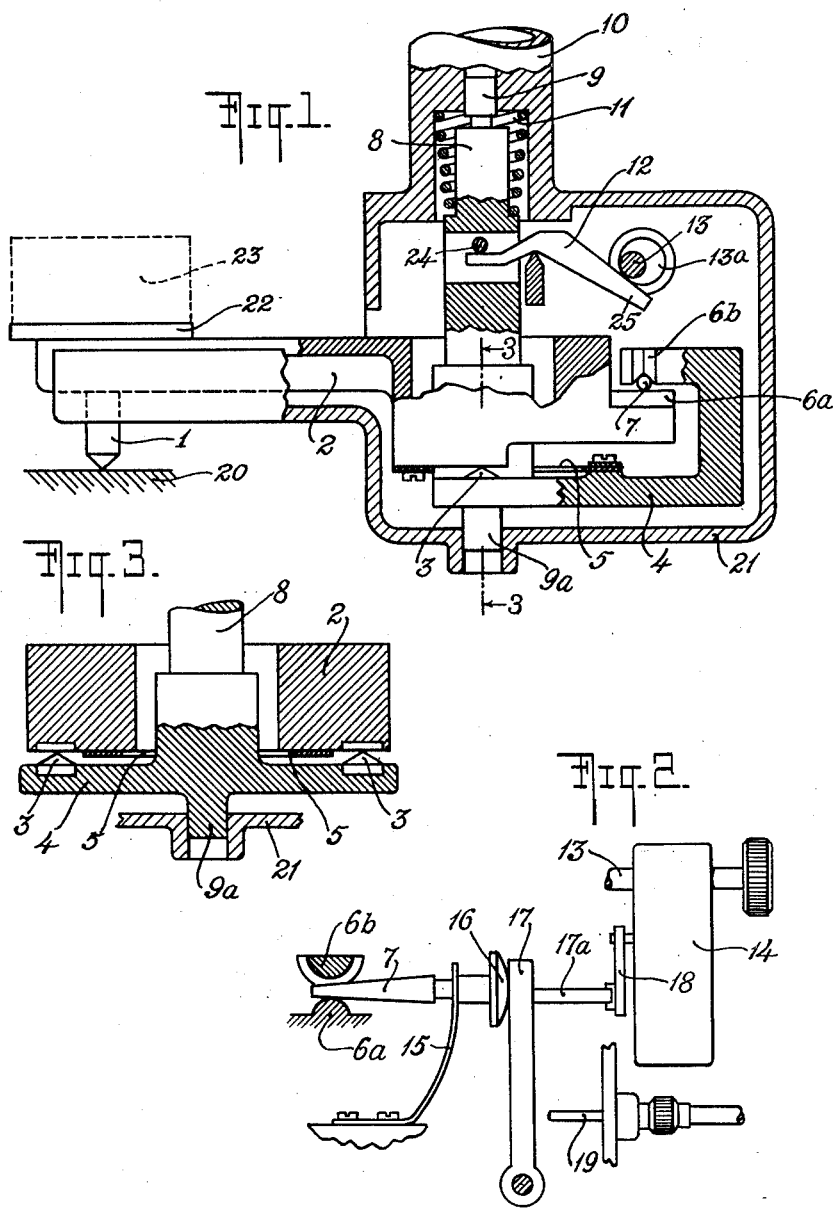

2,637,202

UNITED STATES PATENT OFFICE 2,637,202

MICROHARDNESS TESTER

Heinrich Broschke, Wetzlar, Germany, assignor to Ernst Leitz, G. m. b. H., Wetzlar, Germany, a corporation of Germany Application October 20, 1950, Serial No. 191,157
In Germany October 24, 1949

5 Claims. (Cl. 73—81)

This invention relates to a device for testing the hardness of materials and relates particularly to the smaller type of such testers, known as "Micro-Testers." The prior penetrating movement is initiated and terminated by breaking and closing of an electric contact, for instance, by movement of the supporting means of the testing or penetrating implement.

The present invention has for its object the interruption of the testing operation at the proper moment by mechanical means. Such interruption is accomplished by the use of a spring loaded member which is insertable between the actuating contacts of the testing implement and which is connected with the means causing termination of the penetrating movement.

The drawings illustrate a preferred embodiment of the invention without, however, limiting the invention to said illustration. In the drawings, Fig. 1 is a side view of the device, partly in section; Fig. 2 is a diagrammatic illustration of the spring driven mechanism; and Fig. 3 is a cross section on the line 3—3 of Fig. 1.

The penetrating implement 1 is carried by the arm 2 supported on the knife edge bearing 3 on the bearing element 4. The leaf spring 5 is bolted to the bearing element 4 and arm 2 as illustrated in Fig. 1. The movable pin 7, preferably conically shaped, is interposed between the contact 6a carried by the arm 2 and the contact 6b carried by the bearing element 4. The shaft 8 is rigidly secured to the bearing element 4 and both the shaft 8 and the bearing element 4 are guided in their movement by the sleeves 9 and 9a slidably arranged respectively in the bores in the tubing 10 and in the housing 21. The coil spring 11 is interposed between the shaft 8 and the tubing 10, which are provided with suitable seats for the spring, thereby tending to depress the shaft 8 and causing the pin 24, carried by the shaft 8 to engage one end of the lever 12. The lever 12 is suitably fulcrumed in order that it may rock and its end 25 engages cam 13a of a spring driven mechanism 14 (not illustrated in detail), which cam is eccentrically fastened on the shaft 13.

The movable conical pin 7, which engages the two contacts 6a and 6b, is constantly under the influence of and carried by the leaf spring 15 and is provided with a button-like head 16 which is slightly heavier than the conical member 7. The pivoted lever 17 makes surface contact with the head 16 and carries a pin 17a. The pin 17a is adapted to engage and disengage with the stop member 18 carried by the spring driven mechanism 14. Lever release 19 is arranged on the side of lever 17 opposite to the head 16.

The instrument is enclosed in a housing 21 and, if desired, the additional weights 23 may be placed upon the plate 22 of the arm 2.

To start operation of the device, the lever 17 is pushed to the left (see Fig. 2) by pressing the release 19 thereagainst. The spring driven mechanism 14 is thereby released and commences to function since the stop member 18 is freed from the pin 17a. The movement of the lever 17 to the left also actuates the conical portion of pin 7 so that a thicker portion thereof is in engagement with the contacts 6a and 6b. The spring driven mechanism 14 also drives the shaft 13 of the eccentrically driven cam 13a. Cam 13a engages the end 25 of the lever 12 and permits the bearing element 4 to be depressed under the influence of the spring 11, simultaneously causing penetrating implement 1 to plunge into sample 20. When the penetrating implement 1 has reached a certain depth of penetration in the sample 20, depending upon the kind of material of which the sample is composed, arm 2 is slightly tilted on the knife edge bearing 3, thereby releasing the pin 7 from engagement with the contacts 6a and 6b. Under the influence of the spring 15, pin 7 springs to the right, pushes the lever 17 and its pin 17a to the right, causing the pin 17a to move into range of the stop member 18 and contacting it, thereby interrupting the operation of the device.

I claim:

1. In a hardness tester for materials, in combination, a penetrator, supporting means for the penetrator, a bearing element to which the supporting means is tiltably secured, cooperating contacts carried, respectively, by the bearing element and the supporting means, a shaft secured to the bearing element, a spring mounted coaxially with the shaft and tending to depress the bearing element and said penetrator supporting means, a propelling mechanism adapted to initiate downward movement of the penetrator, an eccentric cam member driven by the propelling mechanism and a lever engaging said shaft and said eccentric cam member, said downward movement of the penetrator being initiated by cooperative engagement of the cam member and the lever, a stop member carried by said propelling mechanism, a movable contacting member arranged to be interposed between said cooperating contacts, a movable member interposed between said stop member and said movable contacting member, and resilient means normally tending to withdraw said movable contact member from said contacts and project said interposed member in the path of said stop member to stop the propelling mechanism and the downward movement of the penetrator.

2. In a hardness tester for materials, a penetrator, a supporting element therefor, a bearing element resiliently carrying said supporting element, and a propelling mechanism controlling the downward movement of the penetrator, in combination with means for terminating the downward movement, said means comprising a movable contacting member arranged to be interposed between said supporting element and said bearing element, a lever interposed between said movable contacting member and said propelling mechanism, and resilient means tending to withdraw said movable contacting member from said supporting and bearing elements and to urge said lever toward said propelling mechanism, said lever, upon being urged toward said propelling mechanism, coacting therewith to stop the action of the propelling mechanism, the testing action of said penetrator terminating when the movable contacting member is withdrawn from said supporting and bearing elements.

3. In a hardness tester for materials, in combination, a penetrator, a supporting element to which the penetrator is secured, a bearing element having knife edges for tiltably supporting said supporting element, a leaf spring for securing the supporting element and the bearing element together, a propelling mechanism controlling the downward movement of the penetrator, an eccentric cam rotatable by said propelling mechanism, transmission means between said cam and said bearing element whereby rotation of the cam controls movement of the bearing element, a conical pin arranged to be interposed between the contact surfaces of the supporting element and the bearing element, a spring attached to and controlling the movement of the pin, and means between the pin and the propelling mechanism, said means being adapted to be moved into contact with and to stop the movement of the propelling mechanism upon movement of the spring-controlled pin away from the contact surfaces.

4. In a hardness tester comprising a penetrator, a supporting element for the penetrator having a contact face, a bearing element having a contact face opposite said first contact face, said bearing element tiltably supporting said supporting element and said contact faces being adapted to move closer and farther apart upon tilting movement of the supporting element upon the bearing element, and propelling means for initiating and terminating downward movement of the penetrator; a member arranged to be inserted between said contact faces, resilient means carrying said member and tending to withdraw said member from said contact faces when said faces move apart, and means, between said member and said propelling means, adapted to be moved into contact with and adapted to stop operation of said propelling means upon withdrawal of the member from the contact faces.

5. A hardness tester comprising, in combination, a penetrator, a supporting element therefor, a bearing element resiliently attached to said supporting element, means on said bearing element for tiltably supporting the supporting element, cooperating contacts on said supporting element and said bearing element, said contacts being adapted to move in relation to each other upon tilting movement of the supporting element on the bearing element, compression spring means arranged to depress the bearing element and, with it, the supporting element and the penetrator, a propelling mechanism controlling movement of the spring means, an eccentric cam rotatable by said propelling mechanism, a two-armed lever cooperating with the bearing element and the cam adapted to release the bearing element upon rotation of the cam so that the compression spring means will depress the bearing element, a reciprocable member arranged to be inserted between said cooperating contacts, a resilient support for said reciprocable member and tending to withdraw said member from said contacts when they move apart, a pivotable member mounted in the path of said reciprocable member and arranged to be moved toward said propelling mechanism upon withdrawal of the reciprocable member from said contacts, and stop means mounted on and movable by said propelling mechanism, said pivotable member engaging said stop means upon its movement by the reciprocable member to stop said propelling mechanism.

HEINRICH BROSCHKE.

References Cited in the file of this patent

UNITED STATES PATENTS

| Number | Name | Date |
|---|---|---|
| 1,367,133 | Guillery | Feb. 1, 1921 |
| 2,224,936 | Smith | Dec. 17, 1940 |
| 2,448,436 | Chester | Aug. 13, 1948 |
| 2,520,387 | Dobry et al. | Aug. 29, 1950 |
| 2,536,632 | Ernst | Jan. 2, 1951 |
| 2,536,880 | James | Jan. 2, 1951 |